(12) United States Patent
Wu

(10) Patent No.: US 6,510,927 B1
(45) Date of Patent: Jan. 28, 2003

(54) LOCKING DEVICE FOR WHEELS OF A GOLF CART

(75) Inventor: Fang-Li Wu, Tainan (TW)

(73) Assignee: Sports World Enterprise Co., Ltd., Tainan Hsien (TW)

( * ) Notice: Subject to any disclaimer, the term of this patent is extended or adjusted under 35 U.S.C. 154(b) by 0 days.

(21) Appl. No.: 10/011,410

(22) Filed: Dec. 11, 2001

(51) Int. Cl.⁷ .................................................. B06T 1/00
(52) U.S. Cl. ........................... 188/31; 188/2 D; 188/19; 280/47.17; 280/651; 280/DIG. 6
(58) Field of Search .............................. 188/31, 19, 20, 188/1.12, 17, 60, 2 D, 2 F; 280/33.994, 642, 645, 651, 652, 47.17, DIG. 6

(56) References Cited

U.S. PATENT DOCUMENTS

| | | | | |
|---|---|---|---|---|
| 4,084,663 A | * | 4/1978 | Haley | ........................... 188/31 |
| 5,456,336 A | * | 10/1995 | Bopp | ........................... 188/17 |
| 5,927,441 A | * | 7/1999 | Luo | ........................... 188/19 |
| 6,378,663 B1 | * | 4/2002 | Lee | ........................... 188/2 F |

* cited by examiner

*Primary Examiner*—Pam Rodriguez
(74) *Attorney, Agent, or Firm*—Rosenberg, Klein & Lee (57) ABSTRACT

A locking device for a rear wheel of a golf cart includes a control member disposed close to the handle of the golf cart, and a locking member disposed close to the inner side of one of a pair of rear wheels. The rear wheel is free to move when a detaining element engages with a movable element for the same to be away from the opening of a housing, thus causing a retreat of an engaging rod to a receiving hole. The rear wheel is locked at an immobile position, when the detaining element disengages from the movable element so as to allow the engaging rod to stick out to engage radially arranged protrusions on the inner side of the rear wheel.

6 Claims, 8 Drawing Sheets

LOCKING DEVICE FOR WHEELS OF A GOLF CART

BACKGROUND OF THE INVENTION

The present invention relates to a locking device for wheels of a golf cart, more particularly, a locking device for golf cart wheels that can prevent the golf cart from unwantedly moving on a slope.

Most conventional golf carts are not provided with a locking device for the wheels, therefore the golf carts are prone to move if the users park the golf carts on a slope, causing inconvenience to the users.

SUMMARY OF THE INVENTION

Therefore, it is a main object of the present invention to provide a locking device for wheels of a golf cart such that the golf cart can't move when the user parks it on a slope.

It is another object of the present invention to provide a locking device for the wheels of a golf cart that is easy to use.

The locking device of the present invention includes a control member disposed below the handle of the golf cart, and a locking member disposed close to the inner side of one of the rear wheels; the control member includes a housing, a movable element, and a detaining element; the locking member includes a steel rope, a locating element and an engaging rod.

The movable element is movably received in an elongated room of the housing with a first end being arranged close to an opening of the housing, and with a ring-shaped part sticking out through an elongated gap of the housing. The movable element is disengagably engaged with the detaining element, which is biased by a spring to stick out from the housing at a button portion.

The steel rope is connected to the first end of the movable element from one end, and connected to the engaging rod from the other end. The locating element is fixedly disposed close to the inner side of the rear wheel, and has a receiving hole, in which the engaging rod is movably received; a spring is confined in the receiving hole to bias the engaging rod towards the rear wheel to engage with radially arranged protrusions of the rear wheel.

Thus, the rear wheel is free to move where the engaging rod is received in the receiving hole of the locating element by pulling the movable element away from the opening of the housing for the movable element to engage with the detaining element to be fixed in position. The rear wheel is locked in an immobile position where an outer end portion of the engaging rod is allowed to stick out from the receiving hole to engage with the radial protrusions of the rear wheel by means of pushing the button portion of the detaining element to allow the detaining element to disengage from the movable element.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
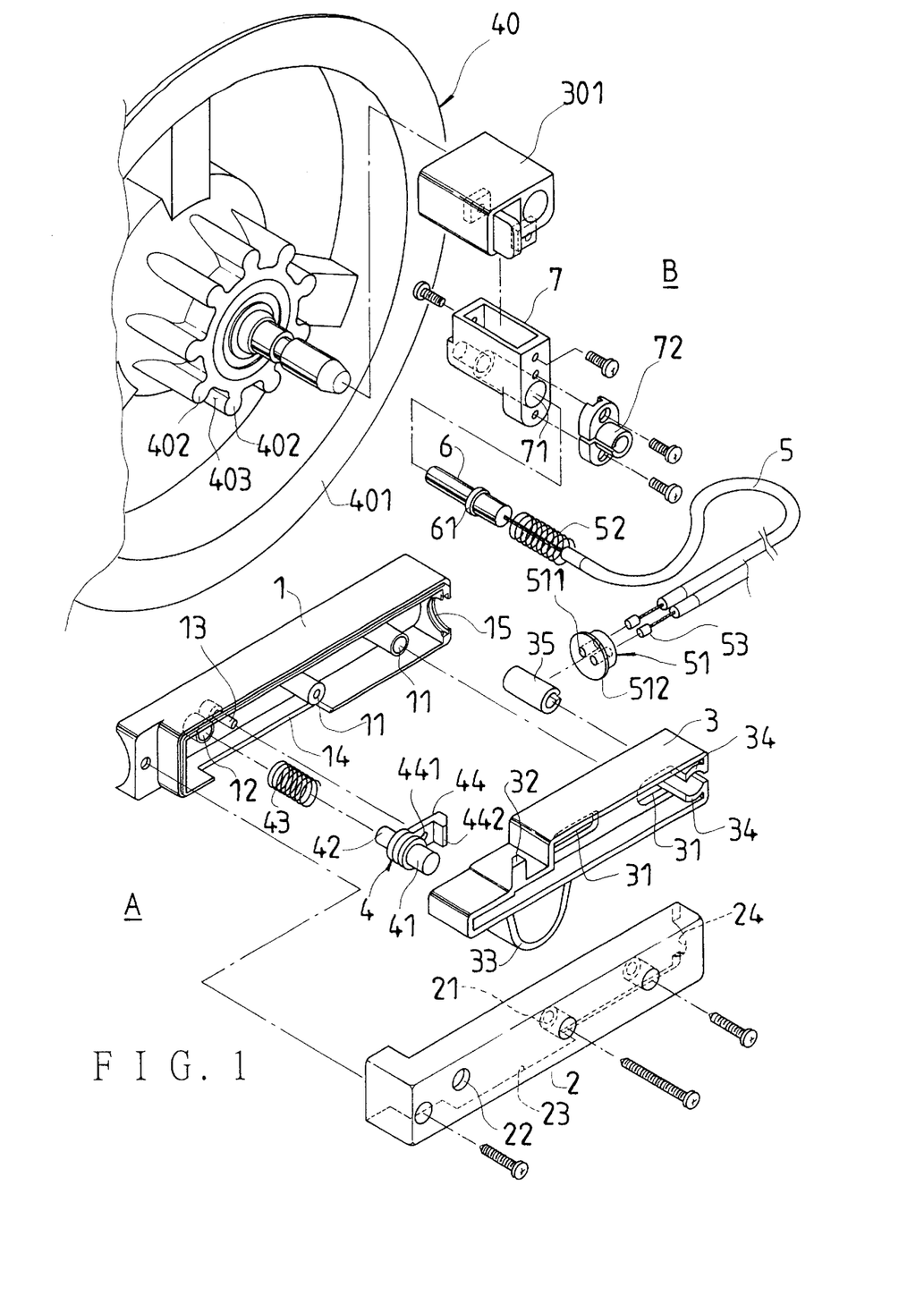
FIG. 1 is an exploded perspective view of the locking device for a golf cart wheel according to the present invention.
Figure 5:
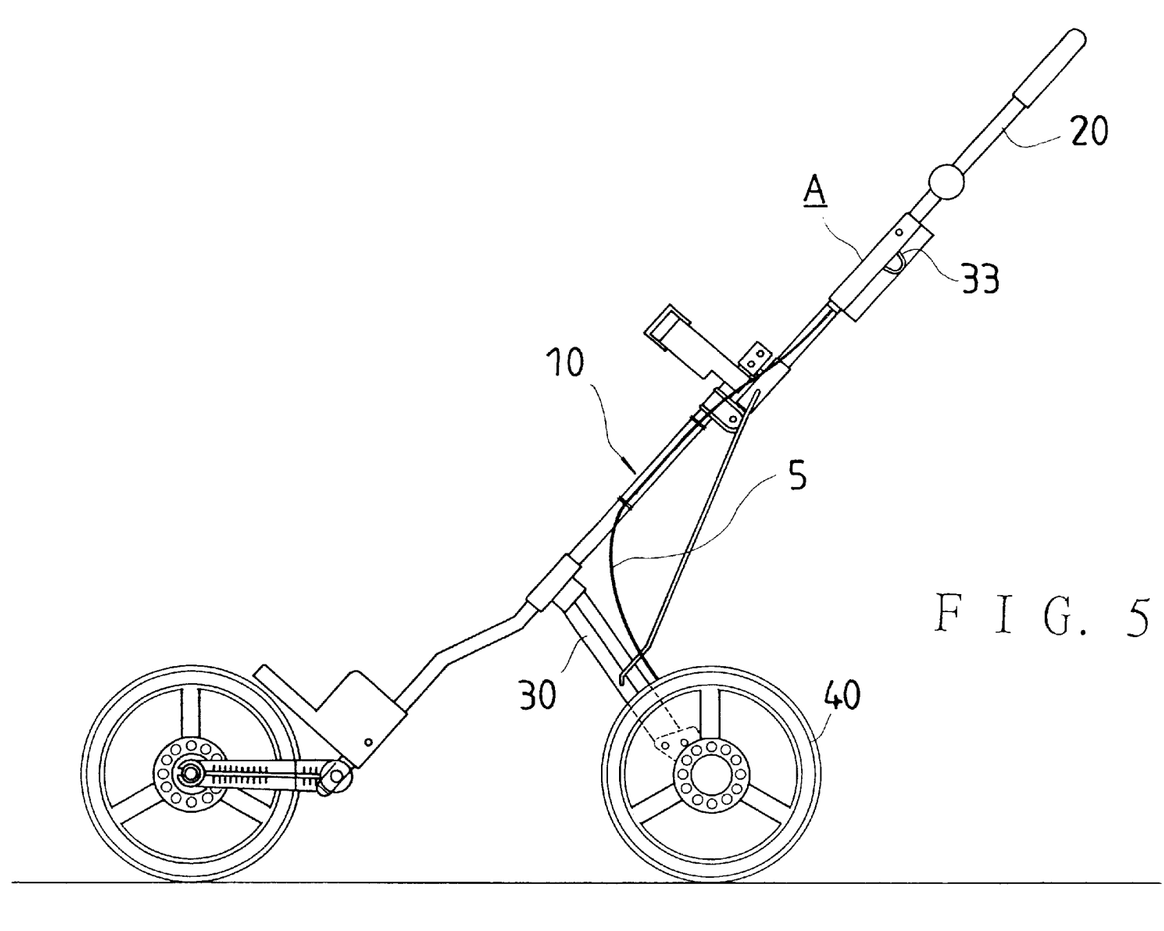
FIG. 5 is a side view of the frame of a golf cart equipped with the locking device of the present invention.

Referring to FIGS. 1 and 5, a locking device for golf cart wheels according to the present invention includes a control member A, and a locking member B, which is disposed between two rear wheels 40 of the golf cart. The rear wheels 40 are each connected to a connecting base 301 at an axle thereof, rear wheel support rods 30 are connected to the connecting bases 301, and a main support element 10 of the golf cart at two ends such that the golf cart can be moved around by pushing or pulling the handle 20 of the golf cart. And, the golf cart can rest on the ground on the rear wheels 40 and a front wheel.

The control member A is disposed close to the handle 20, and includes a left housing part 1, a right housing part 2, a movable element 3, and a detaining element 4. The left housing part 1 has an elongated inner space, in which guiding protrusions 11, a locating protrusion 12, and an inserted rod 13 adjacent to the protrusion 12 are formed; the guiding protrusions 11 each has a screw hole (not numbered); the locating protrusion 12 has a hole. The left housing part 1 further has an elongated gap 14 on the bottom and receiving trench 15 at the rear end. The right housing part 2 has substantially the same shape as the right housing part 1; the right housing part 2 has holed guiding protrusions 21 corresponding to the guiding protrusions 11 of the left part 1, a through hole 22 corresponding to the locating protrusion 12, an elongated gap 23 on the bottom, and a receiving trench 24 at the rear end. The movable element 3 has elongated holes 31 formed along the longest side, an engaging pole 32 sticking up therefrom, a ring-shaped part 33 sticking down therefrom, and two opposing curved plates 34, which hold a cylindrical connecting element 35 in between; the cylindrical element 35 has a lengthwise formed gap facing the rear end of the movable element 3. The detaining element 4 has a button portion 41 sticking out from the right side, a pole 42 sticking out from the left side, and a hook-shaped portion 44 sticking rearwards; the hook-shaped portion 44 has a through hole 441 and an engaging end 442.

Figure 2:
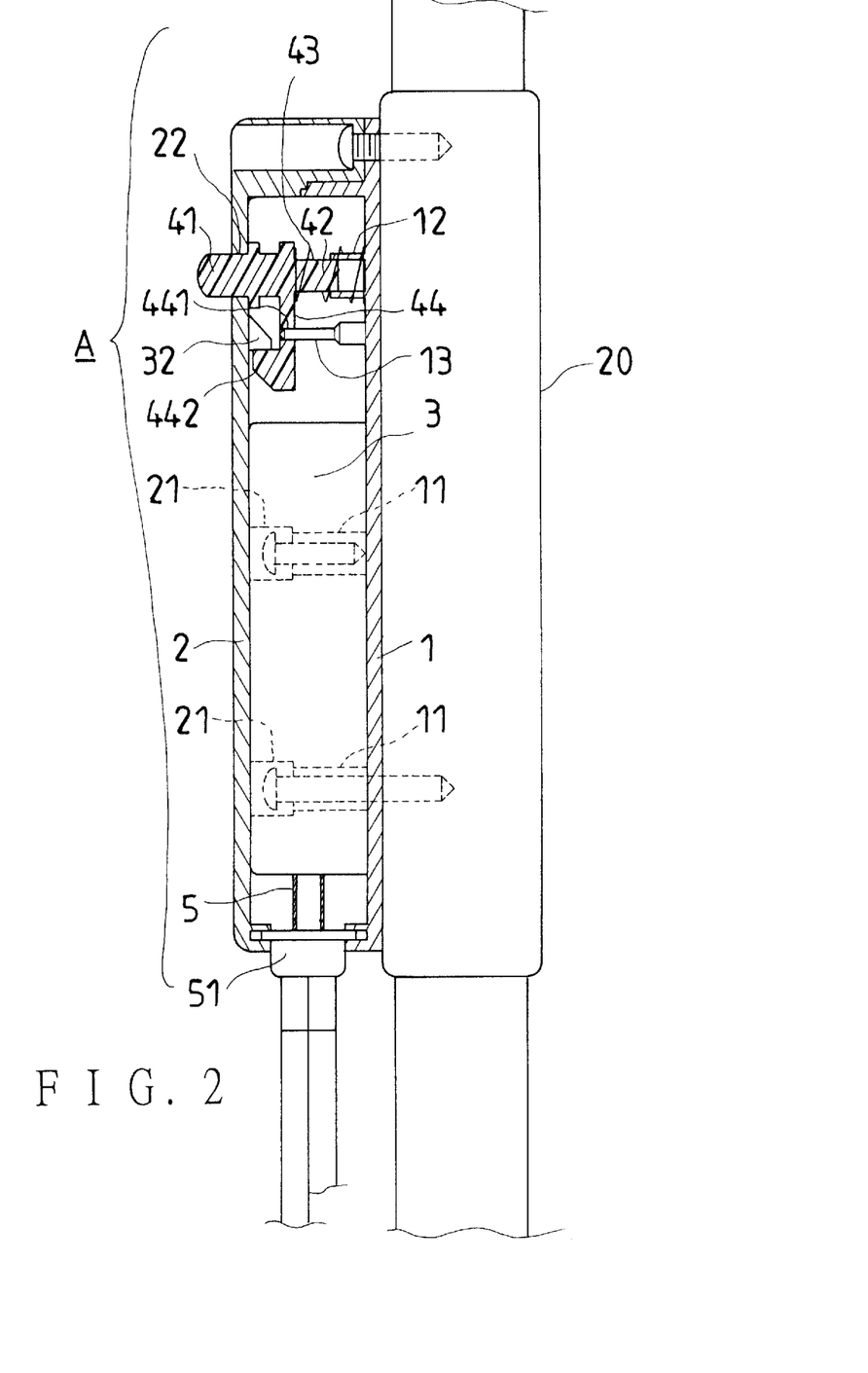
FIG. 2 is a plan view of the control member of the locking device for a golf cart wheel in FIG. 1.
Figure 6:
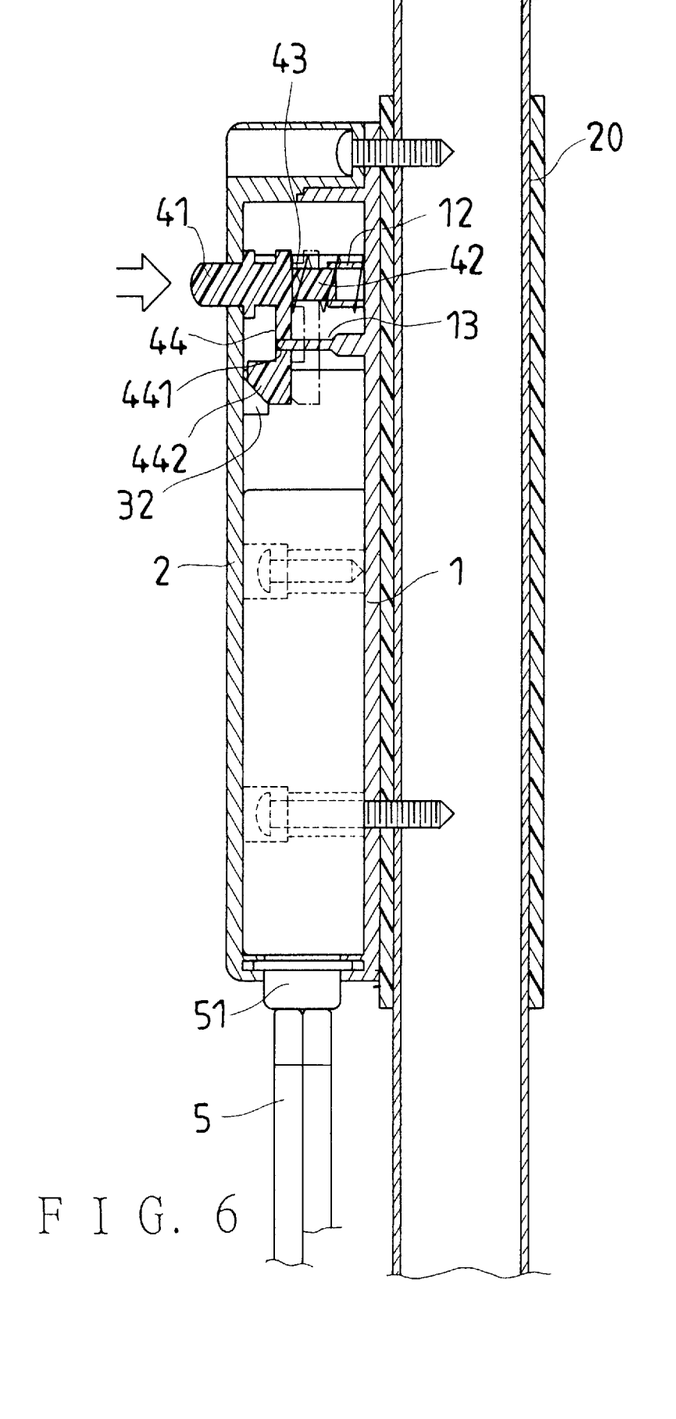
FIG. 6 is a view of the control member of the locking device of the present invention with the movable element being disengaged from the detaining element.
Figure 7:
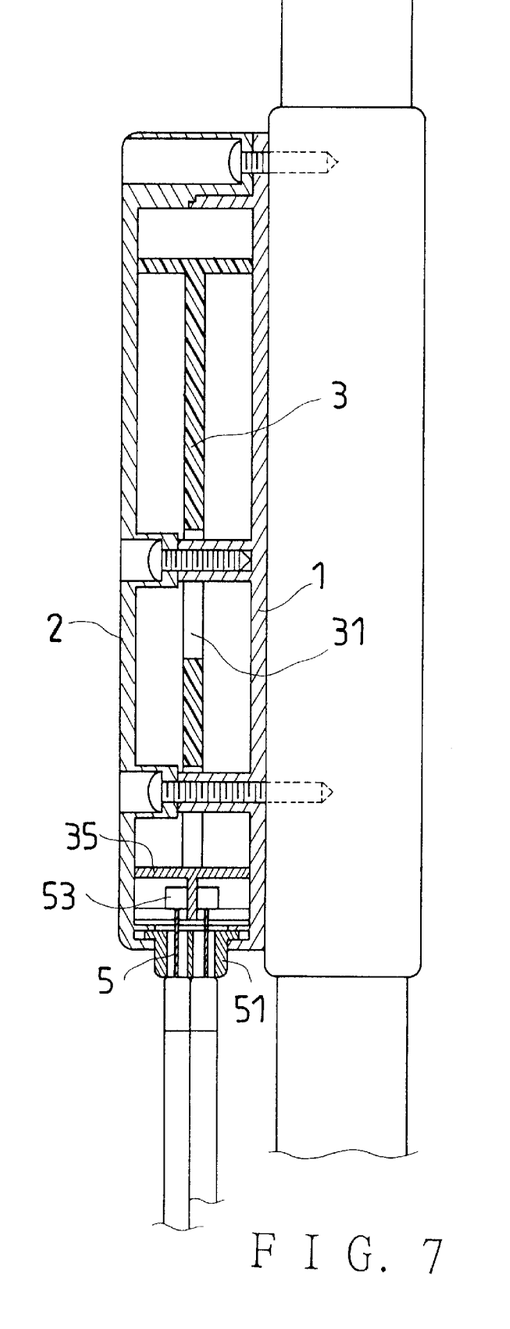
FIG. 7 is another view of the control member with the movable element being disengaged from the detaining element.
Figure 8:
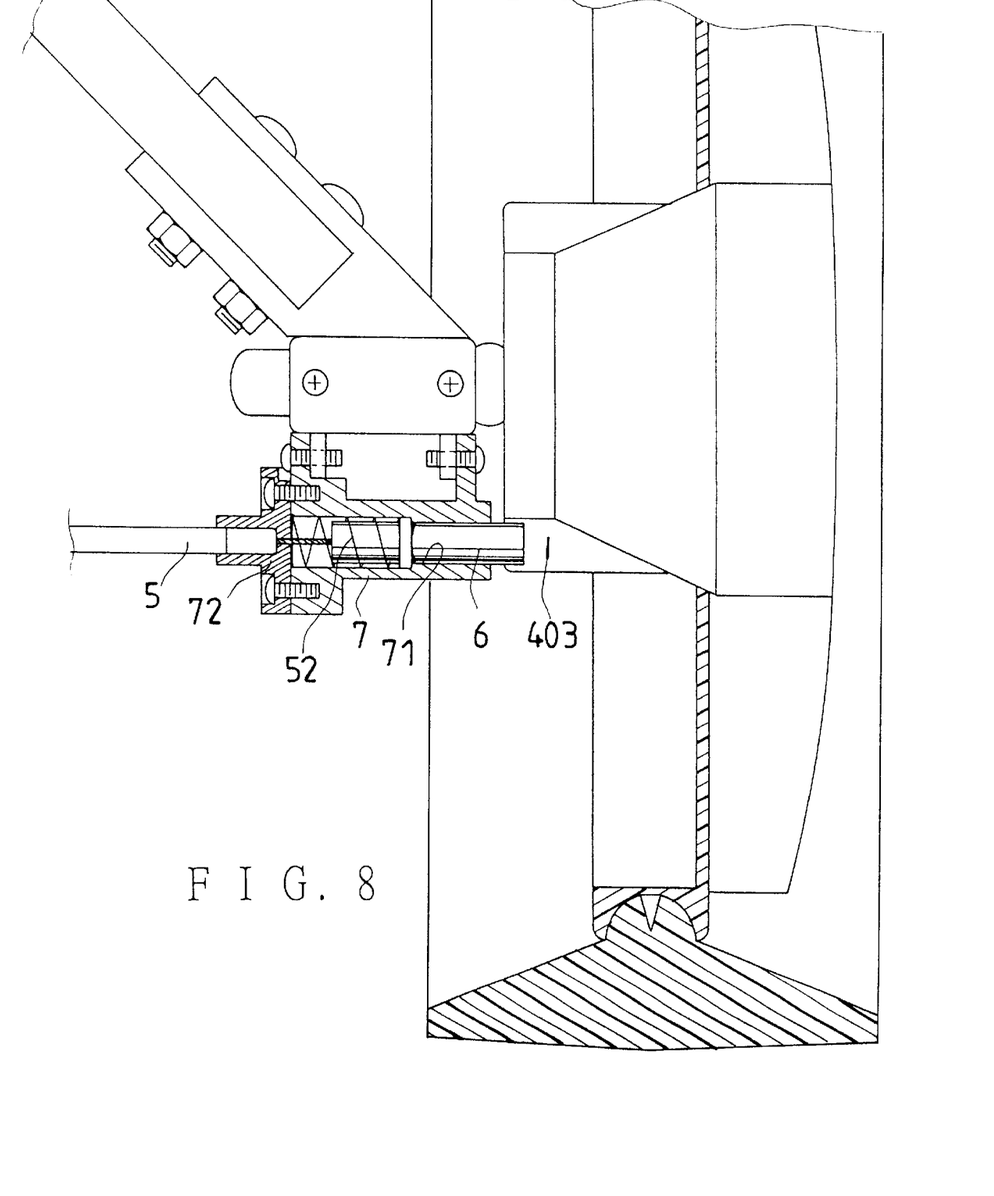
FIG. 8 is a view of the locking member of the locking device with the engaging rod sticking out to engage with the rear wheel.

The right housing part 2 is joined to the left housing part by means of screws, which are passed through the holed guiding protrusions 21 and screwed into the guiding protrusions 11; the movable element 3, and the detaining element 4 are received in the space defined by both the left and the right housing parts 1 and 2; the each pair of connected guiding protrusions 11 and 21 pass through one of the elongated hole 31 of the movable element 3; the ring-shaped part 33 sticks out through an elongated gap defined by both the elongated gaps 14 and 23 of the housing parts 1 and 2. The pole 42 of the detaining element 4 is passed through both a spring 43 and the holed locating protrusion 12 of the left housing part 1, and the spring 43 biases the detaining element 4 towards the right part 2 for allowing the button portion 41 to pass through the through hole 22 of the right housing part 2; the inserted rod 13 is passed through the through hole 441 of the detaining element 4. Thus, the engaging end 442 of the detaining element 4 can separably engage with the engaging pole 32 of the movable member 3 as shown in FIG. 2; when the button portion 41 is pushed, the engaging end 442 disengages from the hole 32, and the movable element 3 is free to move towards the rear end of the housing parts 1 and 2. In addition, both the engaging end 442 and the engaging pole 32 can be formed with slopes (not numbered) such that the pole 32 can easily engage with the engaging end 442 again when the movable element 3 is pushed from the disengaging position towards the front ends of the housing parts 1 and 2 at the ring-shaped part 33 thereof, as shown in FIG. 6.

The rear wheels 40 each has radially arranged protrusions 402, and engaging spaces 403 between every adjacent two of the radial protrusions 402.

Figure 3:
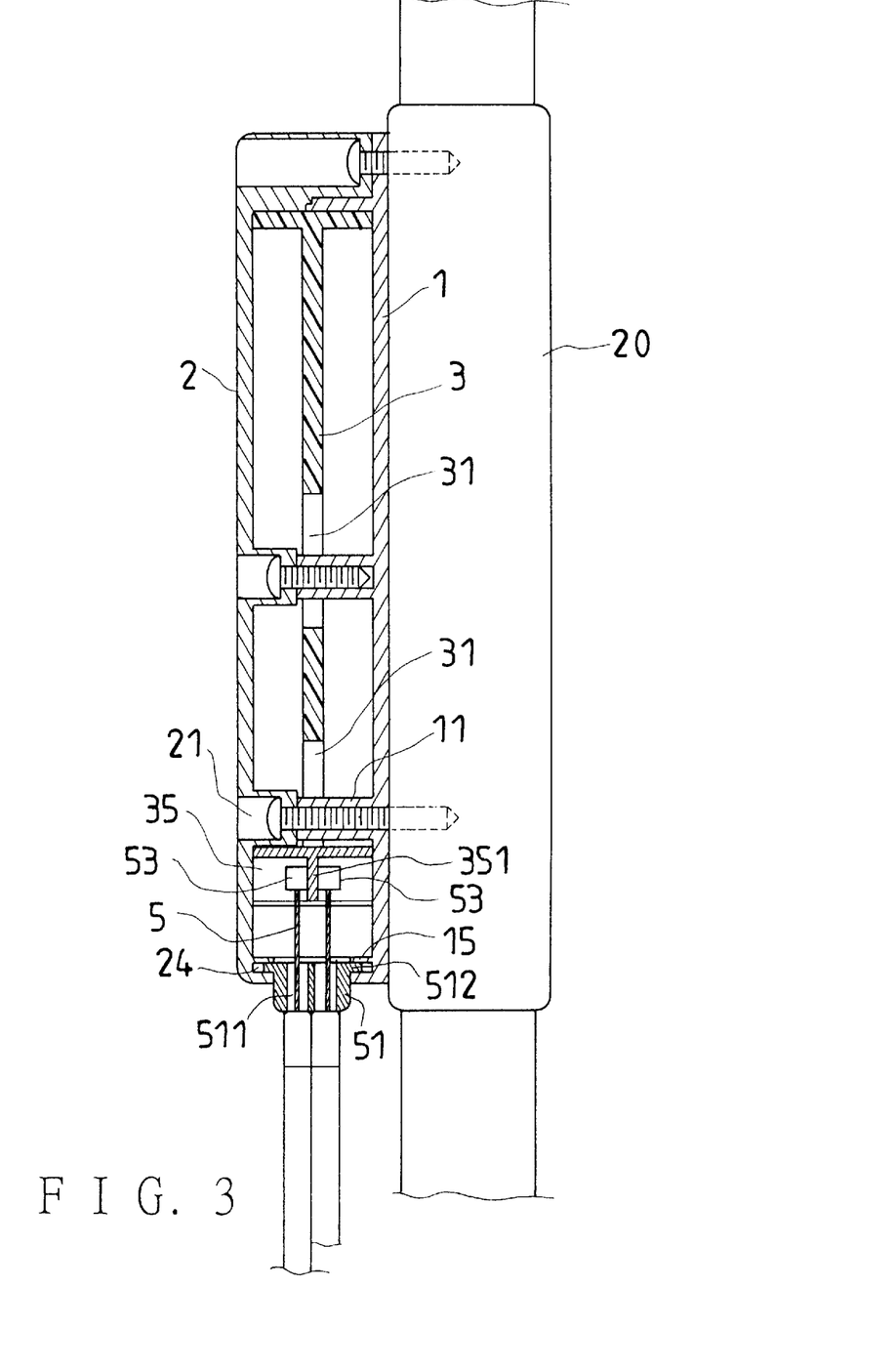
FIG. 3 is another plan view of the control member of the locking device of the present invention.
Figure 4:
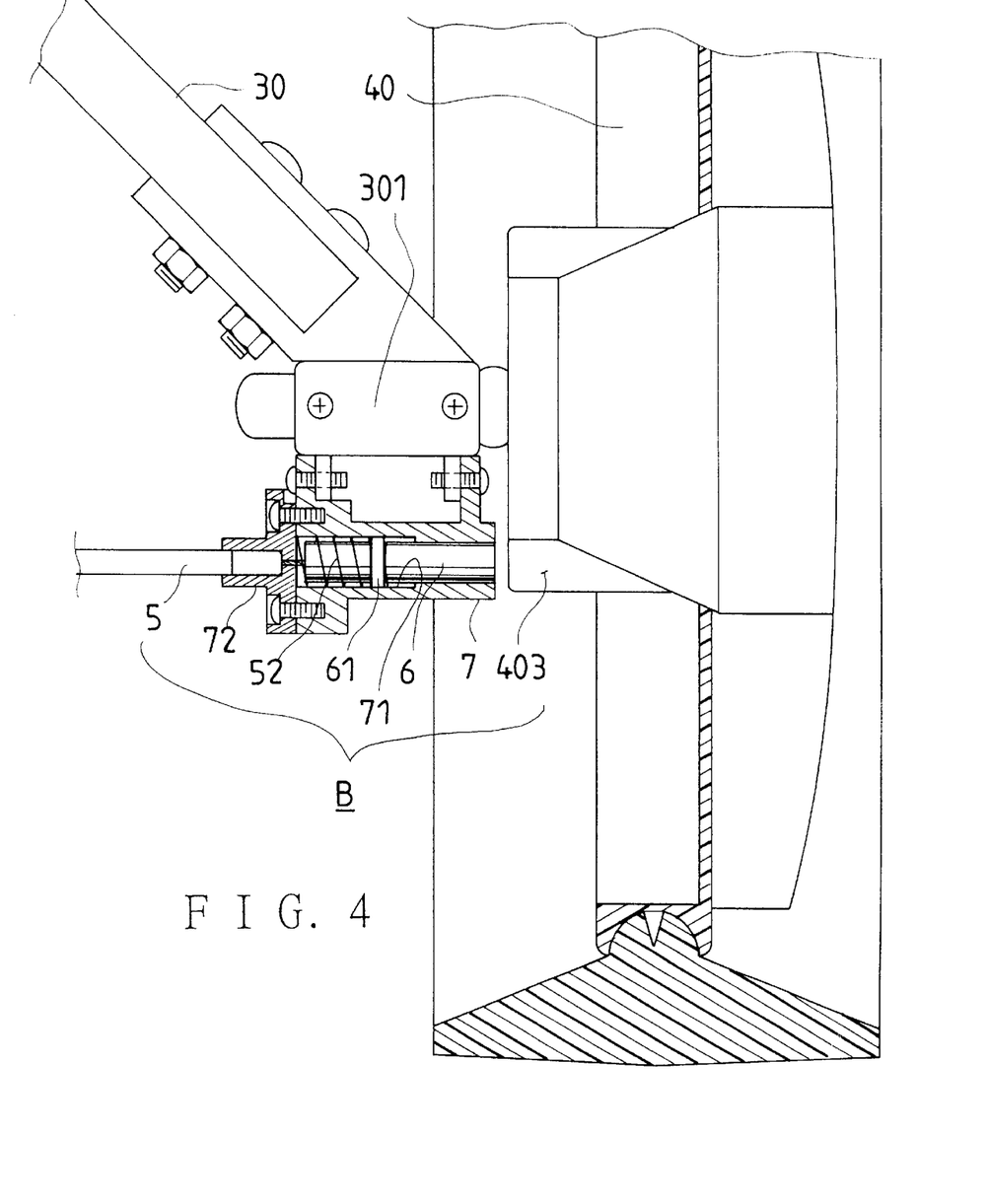
FIG. 4 is a view of the locking member of the locking device of the present invention.

The locking members B each includes a steel rope 5, an engaging rod 6, and a locating element 7; a locking disk 51 having two through holes 511 is secured to each rear end of the housing parts 1 and 2 with a rim 512 being fitted into the receiving trenches 15 and 24 of the housing parts 1 and 2; the steel rope 5 of each of the locking members B is connected to a connecting block 53 at a first end, and passed through one of the through holes 511 of the disk 51 to be secured to a corresponding side of the separating wall 351 of the cylindrical connecting element 35, as shown in FIG. 3; the steel rope 5 of each of the locking members B is passed through a bent tube (not numbered), which is connected to a detaining cover 72 at an outer end thereof, the locking element 7 of each of the locking members B is joined to a respective one of the connecting bases 301, and has a receiving hole 71, which has an outer end portion smaller than an inner end portion; the engaging rods 6 each has a rim 61 at an intermediate portion, and are each movably received in one of the receiving holes 71 with the rim 61 being received in the larger inner end portion of the hole 71 to prevent the engaging rod 6 from falling out of the hole 71; the steel ropes 5 are each connected to one of the inner ends of the engaging rods 6 at the other end; the larger inner end portion of each of the receiving holes 71 of the locating elements 7 receives a spring 52, and the detaining covers 72 are each secured to one of the inner ends of the locating elements 7 to confine the springs 52 such that the springs 52 can bias the engaging rods 6 outwardly of the receiving holes 71 for allowing the smaller outer end portions of the engaging rods 6 to stick out.

When the user wants to move the golf cart, he has to lock the movable element 3 of the control member A at the engaged position by means of pushing the ring-shaped part 33 frontward so as to make the engaging hole 32 of the movable element 3 engage with the engaging end 442 of the detaining element 4; thus, the engaging rods 6 are totally moved back into the receiving holes 71 to disengage from the radially arranged protrusions 402 of the rear wheels 40 due to the connection of the steel ropes 5 to the engaging rods 6 as well as the movable element 3.

When the user wants to rest the golf cart on the ground, he can release the movable element 3 to the disengaged position by means of pushing the button portion 41 of the detaining element 4 such the engaging rods 6 engage the radially arranged protrusions 402 of the rear wheels to prevent the golf cart from unwantedly moving in case the ground slopes; when the button portion 41 is pushed, the springs 52 will bias the engaging rods 6 outwardly of the receiving holes 71 as above said, and the movable element 3 is also pulled towards the rear ends of the housing parts 1 and 2 by the steel ropes 5.

To lock the rear wheels 40 again, the user causes movable element 3 for the engaging hole 32 to engage with the engaging end 442 of the detaining element; the spring 43 will bias the detaining element 4 to the original position when the engaging pole 32 is passed beyond the engaging end 442.

What is claimed is:

1. A locking device for wheels of a golf cart, comprising a control member disposed below a handle of said golf cart;

said control member including:
(1) a housing consisting of a left housing part and a right housing part; said housing parts defining an elongated space there between; said housing having an opening at a first end and an elongated gap; said left housing part having a plurality of guiding protrusions each aligned with one of guiding protrusions of said right housing part;
(2) a movable member movably received in said housing with a first end thereof being arranged close to said first end of said housing; said movable member having elongated holes; said aligned guiding protrusions being passed through a respective one of said elongated holes for guiding a movement of said movable element along said elongated space of said housing; said movable element having an engaging pole sticking up in said housing, and a ring-shaped part sticking out through said elongated gap of said housing;
(3) a detaining element including a button portion and an engaging end; said detaining element being received in said housing, and biased towards said right housing part by a first spring so as to allow said button portion to stick out through a through hole of said right housing part; said engaging end being capable of engaging with said engaging pole of said movable element to fix said movable element in a first position when said movable element is moved away from said first end of said housing by said ring-shaped part;

and a locking member including:
(1) a steel rope secured to said movable element at a first end thereof;
(2) a locating element fixedly disposed adjacent to an inner side of one of two rear wheels of said golf cart; said locating element having a receiving hole having an outer end facing said rear wheel;
(3) an engaging rod movable received in said receiving hole; said engaging rod being connected to a second end of said steel rope so as to be moved together with said movable element, and being biased toward said rear wheel by a second spring confined in said receiving hole so as to stick out through said receiving hole from an outer end portion thereof;

whereby said rear wheel of said golf cart can be locked at an immobile position when said engaging rod is released to be biased outwards by said second spring to engage with radial protrusions on said inner side of said rear wheel by means of making said movable element disengage from said detaining element; said rear wheel is unlocked from said immobile position when said engaging rod is moved inwardly of said receiving hole to disengage from said rear wheel by means of pushing said movable element away from said first end of said housing.

2. The locking device for wheels of a golf cart as claimed in claim 1, wherein said movable element has two opposing curved plates at said first end thereof, and a cylindrical connecting element secured between said curved plates; said cylindrical connecting element having a slot facing said first end of said movable element for allowing said steel rope to pass through to be connected to an inner side thereof.

3. The locking device for wheels of a golf cart as claimed in claim 1, wherein said left housing part has a holed locating protrusion, and said detaining element has a pole at an outer side of said button portion thereof; said pole being passed through said first spring and into said holed locating protrusion for allowing said detaining element to be biased towards said right housing part by said first spring.

4. The locking device for wheels of a golf cart as claimed in claim 1, wherein said left housing part has an inserted rod passing through a through hole of said detaining element for guiding a movement of said detaining element.

5. The locking device for wheels of a golf cart as claimed in claim 1, wherein said first end of said housing is formed with a receiving trench, and a disk is connected to said first end of said housing with a rim being fitted into said receiving trench; said disk having holes for allowing said first end of said steel rope to pass through in order to be connected to said movable element.

6. The locking device for wheels of a golf cart as claimed in claim 1, wherein said engaging end of said detaining element has a slope, and said engaging pole of said movable element has a slope corresponding to said slope of said detaining element for helping said engaging pole to be moved beyond said engaging end to engage with the same when said movable element is moved away from said first end of said housing.

* * * * *